US010250677B1

(12) United States Patent
Aizikovich

(10) Patent No.: US 10,250,677 B1
(45) Date of Patent: Apr. 2, 2019

(54) DECENTRALIZED NETWORK ADDRESS CONTROL

(71) Applicant: CyberArk Software Ltd., Petach-Tikva (IL)

(72) Inventor: Evgeni Aizikovich, Petach-Tikva (IL)

(73) Assignee: CyberArk Software Ltd., Petach-Tikva (IL)

( * ) Notice: Subject to any disclaimer, the term of this patent is extended or adjusted under 35 U.S.C. 154(b) by 0 days.

(21) Appl. No.: 15/969,055

(22) Filed: May 2, 2018

(51) Int. Cl.
*G06F 15/173* (2006.01)
*H04L 29/08* (2006.01)
*H04L 29/12* (2006.01)

(52) U.S. Cl.
CPC ...... *H04L 67/1029* (2013.01); *H04L 61/1511* (2013.01); *H04L 67/1093* (2013.01)

(58) Field of Classification Search
CPC ............. H04L 67/1029; H04L 61/1511; H04L 67/1093
USPC ......................................................... 709/224
See application file for complete search history.

(56) References Cited

U.S. PATENT DOCUMENTS

| | | | | | |
|---|---|---|---|---|---|
| 6,092,178 A | * | 7/2000 | Jindal | ............... | H04L 29/12009 712/27 |
| 6,108,703 A | * | 8/2000 | Leighton | ............. | G06F 17/3089 709/226 |
| 6,119,143 A | * | 9/2000 | Dias | ........................ | G06F 9/505 709/201 |
| 6,128,279 A | * | 10/2000 | O'Neil et al. | ...... | H04L 67/1008 370/229 |
| 6,578,066 B1 | * | 6/2003 | Logan | ............... | H04L 29/12009 370/312 |
| 7,155,515 B1 | * | 12/2006 | Brown | ................ | H04L 67/1008 709/226 |
| 7,254,626 B1 | * | 8/2007 | Kommula | ........... | H04L 67/1008 709/217 |

(Continued)

OTHER PUBLICATIONS

Abhijit et al. "A Comparative Analysis of Centralized and Distributed Dynamic Load Balancing Algorithms for Cluster Based Video-on-Demand Systems". ICWET. 2011. pp. 1-6. (Year: 2011).*

(Continued)

*Primary Examiner* — Imad Hussain
(74) *Attorney, Agent, or Firm* — Finnegan, Henderson, Farabow, Garrett & Dunner LLP

(57) ABSTRACT

Systems and methods are provided for decentralized network address control, including a computer-implemented method for decentralized load balancing for a plurality of network resources. The method can include determining a load characteristic for the first network resource. The load characteristic can be determined by a first load balancing application associated with a first network resource. The method can further include sending a report to a network address resolution resource, based on the determined load characteristic. The network address resolution resource can be configured to also receive reports from other load balancing applications associated with other network resources based on determined load characteristics for the other network resources. Both the first network resource and the other network resources can be associated with a common network resource name. The method can further include receiving a request to communicate with the first network resource after sending, and because of sending, the report.

22 Claims, 3 Drawing Sheets

(56) References Cited

U.S. PATENT DOCUMENTS

| | | | | |
|---|---|---|---|---|
| 7,346,676 B1* | 3/2008 | Swildens | | H04L 67/1008 709/223 |
| 9,237,087 B1* | 1/2016 | Risbood | | H04L 45/00 |
| 2001/0047415 A1* | 11/2001 | Skene | | H04L 29/06 709/226 |
| 2001/0049741 A1* | 12/2001 | Skene | | G06F 9/505 709/232 |
| 2001/0052016 A1* | 12/2001 | Skene | | G06F 9/505 709/226 |
| 2002/0103846 A1* | 8/2002 | Zisapel | | G06F 9/505 718/105 |
| 2002/0147810 A1* | 10/2002 | Traversat | | G06F 9/4416 709/224 |
| 2002/0194335 A1* | 12/2002 | Maynard | | G06F 9/505 709/225 |
| 2003/0069974 A1* | 4/2003 | Lu | | G06F 9/505 709/226 |
| 2003/0172163 A1* | 9/2003 | Fujita | | H04L 67/1008 709/226 |
| 2005/0027862 A1* | 2/2005 | Nguyen | | G06F 9/505 709/225 |
| 2006/0143283 A1* | 6/2006 | Makofka | | H04L 67/325 709/217 |
| 2006/0190602 A1* | 8/2006 | Canali | | H04L 29/06 709/226 |
| 2008/0043622 A1* | 2/2008 | Kamath | | H04L 43/08 370/235 |
| 2009/0300407 A1* | 12/2009 | Kamath | | G06F 9/505 714/4.11 |
| 2010/0121932 A1* | 5/2010 | Joshi | | H04L 67/1008 709/207 |
| 2011/0093522 A1* | 4/2011 | Chen | | H04L 29/12066 709/203 |
| 2011/0153723 A1* | 6/2011 | Mutnuru | | H04L 29/12066 709/203 |
| 2011/0153810 A1* | 6/2011 | Raja | | H04L 67/1029 709/224 |
| 2011/0153831 A1* | 6/2011 | Mutnuru | | H04L 29/12066 709/226 |
| 2011/0307541 A1* | 12/2011 | Walsh | | H04L 67/1034 709/203 |
| 2012/0066371 A1* | 3/2012 | Patel | | H04L 67/1031 709/224 |
| 2013/0198319 A1* | 8/2013 | Shen | | G06F 9/5077 709/217 |
| 2014/0304412 A1* | 10/2014 | Prakash | | H04L 61/1511 709/226 |
| 2015/0281111 A1* | 10/2015 | Carl | | H04L 47/70 709/226 |
| 2016/0266938 A1* | 9/2016 | Suzuki | | G06F 9/5083 |
| 2016/0299772 A1* | 10/2016 | Seenappa | | G06F 9/45558 |
| 2016/0337263 A1* | 11/2016 | Imai | | H04L 67/2814 |
| 2018/0063237 A1* | 3/2018 | Cui | | H04L 67/1036 |
| 2018/0176289 A1* | 6/2018 | Watanabe | | H04L 61/1511 |

OTHER PUBLICATIONS

Klein, Matt. "Introduction to modern network load balancing and proxying". Envoy Proxy. Dec. 27, 2017. pp. 1-26. (Year: 2017).*

* cited by examiner

DECENTRALIZED NETWORK ADDRESS CONTROL

BACKGROUND

Virtualization technologies are broadly applicable in many technological fields. As a result, many organizations worldwide rely on virtualization to reduce development times and development costs, while increasing the flexibility and scalability of applications. Organizations can rely on on-premises or cloud-computing platforms, such as AMAZON WEB SERVICES, MICROSOFT AZURE, and others.

On-premises and cloud-computing platforms can be described in terms of an acceptable level of service availability. Typical levels of service availability include 99%, 99.9%, 99.99%, and 99.999% uptime. Such high levels of availability are often achieved by deploying multiple redundant server instances, which are subject to repeated health checks and restarted as necessary. One or more dedicated load balancer devices can then distribute client requests among the redundant server instances. Such centralized load balancing can be performed using either software or hardware load balancers, though production systems typically use dedicated load-balancing devices. In some architectures, a cluster of load-balancing devices can be configured to receive incoming requests and redirect them to available server instances. In this manner, the load balancers can act as reverse proxies.

But this conventional architecture poses technical problems. Small to medium size organizations may not be able to support the additional complexity and expense of a load balancer, let alone the multiple load balancers potentially required by a complex cloud architecture. Furthermore, properly configuring and maintaining a load-balancing device can be a complex task beyond the capabilities of such an organization.

Most organizations have a DNS server, such as Microsoft Active Directory™ server, which is responsible for resolving domain names of machines located inside an internal network. While some Domain Name Service (DNS) devices offer built-in load balancing services, these devices rely upon a central unit and require replacement of existing DNS servers.

Consequently, systems and methods are needed for decentralized address control that are compatible with existing DNS servers. Furthermore, such systems and methods should be easily maintainable and expandable.

SUMMARY

The disclosed embodiments describe systems and methods for decentralized address control. Such systems and methods are compatible with existing DNS servers and can provide, for example, distributed load balancing among multiple server instances without a need for a centralized load balancer (whether software or hardware). These systems and methods can be used with on-premises or cloud-computing platforms. According to the envisioned systems and methods, server instances can automatically determine availability. An available unit can post a DNS record (e.g., an A record) into the existing DNS server, pointing to itself. Incoming DNS name requests can then resolve to that most available unit, causing client requests to be directed to it. This architecture can also be used for reverse proxying, virtual IP address services, and the like.

The disclosed embodiments can include a non-transitory, computer-readable medium containing instructions. When executed by at least one processor, the instructions can cause the at least one processor to perform operations for decentralized load balancing for a plurality of network resources. The operations can include determining a load characteristic for the first network resource. The load characteristic can be determined by a first load balancing application associated with a first network resource. The operations can include sending, based on the determined load characteristic, a report to a network address resolution resource. The network address resolution resource can be configured to also receive reports from other load balancing applications associated with other network resources based on determined load characteristics for the other network resources. Both the first network resource and the other network resources can each be associated with a common network resource name. The operations can further include receiving a request to communicate with the first network resource. The request can be received from a client that has identified the common network resource name and been directed to the first network resource by the network address resolution resource.

In some embodiments, the first load balancing application can be integrated into software running on the first network resource. The first load balancing application, in some embodiments, can be a software agent running on the first network resource.

In some embodiments, the report sent to the network address resolution resource can include network address information associated with the first network resource. In some aspects, the network address resolution resource can be configured to store the network address information and use it for resolving address queries involving the common network resource name. In some embodiments, the network address resolution resource can be a DNS server.

The first network resource and the other network resources can each be, in some embodiments, instantiations of a single network resource. The first network resource and the other network resources can each be, in some embodiments, instantiated as virtual machines. The first network resource and the other network resources can each be, in some embodiments, instantiated as containers.

The determined load characteristic can represent, in some embodiments, the current load of the first network resource. The determined load characteristic can represent, in various embodiments, an anticipated future load of the first network resource.

The disclosed embodiments can include a computer-implemented method for decentralized load balancing for a plurality of network resources. The method can include determining, by a first load balancing application associated with a first network resource, a load characteristic for the first network resource. The method can include sending, based on the determined load characteristic, a report to a network address resolution resource. The network address resolution resource can be configured to also receive reports from other load balancing applications associated with other network resources based on determined load characteristics for the other network resources. Both the first network resource and the other network resources can each be associated with a common network resource name. The method can further include receiving, from a client that has identified the common network resource name and been directed to the first network resource by the network address resolution resource, a request to communicate with the first network resource.

In some embodiments, the first load balancing application can be configured to communicate with the other load balancing applications. In various aspects, the first load balancing application and the other load balancing applications can each send, based on their respective determined load characteristics, reports to the network address resolution resource. In some aspects, the network address resolution resource updates stored network address information using the reports as they are received. In various aspects, the first load balancing application and the other load balancing applications can designate, based on their respective determined load characteristics, a single load balancing application to send the report to the network address resolution resource. In some aspects, the single load balancing application can be designated on the basis of it having the lowest determined load. In various aspects, the single load balancing application can be designated on the basis of it having experienced a period of inactivity lasting a threshold amount of time.

In some embodiments, the first load balancing application and the other load balancing applications can be authenticated to the network address resolution resource. The first network resource and the other network resources can each be, in some embodiments, identical instantiations of the same network resource. The first network resource and the other network resources can each be, in various embodiments, different but designed to handle a common type of client request.

The disclosed embodiments can include a computer-implemented method for decentralized address management. The method can include determining, by a first monitoring application associated with a first network resource, a load characteristic for the first network resource. The method can further include sending, based on the determined load characteristic, a first report to an address resource. The first monitoring application can be configured to communicate with the other monitoring applications. The monitoring application and the other monitoring applications can each send, based on their respective determined load characteristics, reports to the address resource. The address resource can update stored network address information using the reports to the address resource as they are received. The method can further include receiving a client request routed to the first network resource from the address resource based on the stored network address information when the first report is the most recently received of the reports to the address resource.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings are not necessarily to scale or exhaustive. Instead, emphasis is generally placed upon illustrating the principles of the inventions described herein. These drawings, which are incorporated in and constitute a part of this specification, illustrate several embodiments consistent with the disclosure and, together with the detailed description, serve to explain the principles of the disclosure. In the drawings.

DETAILED DESCRIPTION

In the following detailed description, numerous specific details are set forth in order to provide a thorough understanding of the disclosed example embodiments. However, it will be understood by those skilled in the art that the principles of the example embodiments may be practiced without every specific detail. Well-known methods, procedures, and components have not been described in detail so as not to obscure the principles of the example embodiments. Unless explicitly stated, the example methods and processes described herein are neither constrained to a particular order or sequence, nor constrained to a particular system configuration. Additionally, some of the described embodiments or elements thereof can occur or be performed simultaneously, at the same point in time, or concurrently. Reference will now be made in detail to the disclosed embodiments, examples of which are illustrated in the accompanying drawings. Unless explicitly stated, sending and receiving as used herein are understood to have broad meanings, including sending or receiving in response to a specific request or without such a specific request. These terms thus cover both active forms, and passive forms, of sending and receiving.

As described herein, the disclosed systems and methods enable distributed control of network addressing. Monitoring applications, each associated with one or more network resources, can be configured to interact with a network address resource. The network address resource can be responsible for managing the domain names of the network resources, and the monitoring applications can interact with the network address resource to affect the provision of IP addresses. Such distributed control of network addressing can be implemented on a cloud-based platform or an on-premises computing system.

As discussed herein, monitoring applications can perform load balancing, reverse proxying, virtual IP addressing, or the like, without using a central control device or service. For example, when the network address resource is a DNS service, new network resources associated with new monitoring applications can be added to the system without requiring modification of this existing DNS server. In some aspects, software and hardware upgrades can be transparent to the network address resource. For example, when transitioning to newer network resources (e.g., to an updated server image or container), outdated network resources can stop participating in the distributed address control process, causing tasks to no longer be routed to these network resources. In some embodiments, the network resources and the network address resource can be located in different networks.

Figure 1:
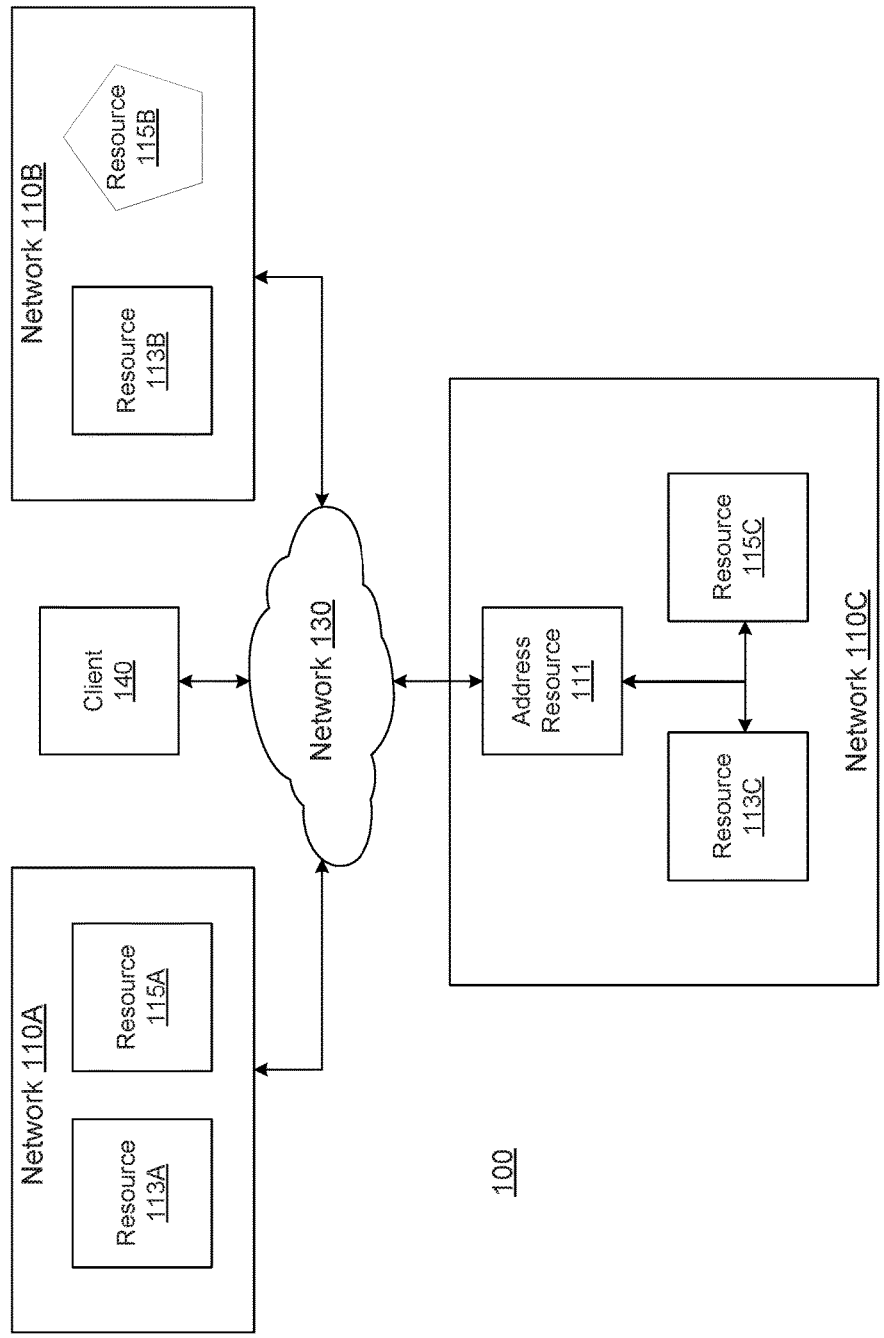
FIG. 1 depicts a schematic illustrating an exemplary system for decentralized address provisioning.

FIG. 1 depicts a schematic illustrating an exemplary system 100 for decentralized network address control, consistent with disclosed embodiments. A network address resolution resource (e.g., address resource 111) can be configured to provide address services to network resources (e.g., network resources 113A, 115A, 113B, 115B, 113C, and/or 115C) in networks 110A, 110B, and/or 110C. Consistent with disclosed embodiments, monitoring applications, each associated with one or more of these network resources, can be configured to provide a report to address resource 111, which can be configured to perform network address control based on such reports. In this manner, address resource 111 can centralize network address resolution services, without centralizing network address control. System 100 can therefore exercise network address control in a bottom-up, decentralized manner.

Network 110A can be associated with one or more computing devices (e.g. mobile devices, workstations, desktops, servers, switches, routers, firewalls, and the like). These computing devices can include virtualized devices, such as virtual machines or containers. At least some of these computing devices can be arranged as a cluster or as a grid. The computing devices can be configured as (or configured as part of) a cloud computing infrastructure (e.g., a system providing Infrastructure as a Service, Platform as a Service, Software as a Service, or the like). Such a cloud computing environment may be public, private, or hybrid public-private. In some embodiments, the computing devices can be part of an on-premises computing system. Network 110A can be configured to provide communications, exchange information, and/or facilitate the exchange of information among these computing devices. For example, network 110A can be or can include a wide area network, Local Area Network, personal area network, near field communication (NFC) network, cellular network, satellite network, mesh network, or the like.

Network resource 113A and network resource 115A can be physical servers, virtual machines (e.g., virtual servers), services, pods, containers (e.g., docker containers), or applications. In some embodiments, network resource 113A and/or network resource 115A can be implemented in whole or in part using cloud-based, on-demand, or other Internet-enabled computing. In various embodiments, network resource 113A and/or network resource 115A can be implemented in whole or in part using an on-premises computing system. In some embodiments, network resource 113A and network resource 115A can be instantiations of a single network resource (e.g., virtual machine images, container images, or the like). Network resource 113A and network resource 115A can be configured to communicate with clients in response to client requests (e.g., from client 140). Such communication can include executing tasks and/or providing data. Client requests can be received from other computing devices on network 110A or from devices outside network 110A (e.g., client 140). Network resource 113A and network resource 115A can be configured to handle a common type of client request (e.g., they can be designed to execute the same jobs or retrieve the same files).

Network resource 113A and network resource 115A can each be associated with a monitoring application (not shown), consistent with disclosed embodiments. In some embodiments, such monitoring applications can be deployed to the same locations (e.g., same physical hosts, virtual machines, pods, containers, or the like) as their associated network resources. For example, the monitoring application associated with network resource 113A can be running on the same physical host as network resource 113A. In some embodiments, the monitoring applications can be deployed to different locations than their associated network resources. The monitoring applications can be configured to perform distributed load balancing, routing, reverse proxying, and/or virtual IP services. In some embodiments, the monitoring applications can be configured with authentication credentials. The monitoring applications can use these credentials (e.g., username and password, certificate, cryptographic token, cryptographic key, hash, biometric information, keystroke pattern, behavior analytics, or the like) for authentications with address resource 111. The authentication credentials can be specific to address resource 111, a particular network (e.g., network 110A, 110B, or 110C), a monitoring application, and/or a network resource. In various embodiments, the monitoring applications can be configured as software.

Like network 110A, network 110B can be associated with one or more computing devices (e.g. mobile devices, workstations, desktops, servers, switches, routers, firewalls, and the like). These computing devices can include physical devices or virtualized devices, such as virtual machines, containers, etc. At least some of these computing devices can be arranged as a cluster or as a grid. The computing devices can be configured as (or configured as part of) a cloud computing infrastructure (e.g., a system providing Infrastructure as a Service, Platform as a Service, Software as a Service, or the like, as discussed above). Such a cloud computing environment may be public, private, or hybrid public-private. In some embodiments, the computing devices can be part of an on-premises computing system. Network 110B can be configured to provide communications, exchange information, and/or facilitate the exchange of information among these computing devices. For example, network 110A can be or can include a wide area network, Local Area Network, personal area network, near field communication (NFC) network, cellular network, satellite network, mesh network, or the like. In some aspects, network 110B can physically or logically overlap with network 110A.

Network resource 113B and network resource 115B can be physical servers, virtual machines (e.g., virtual servers), containers (e.g., docker containers), or applications. In some embodiments, network resource 113B and/or network resource 115B can be implemented in whole or in part using cloud-based, on-demand, or other Internet-enabled computing. In various embodiments, network resource 113B and/or network resource 115B can be implemented in whole or in part using an on-premises computing system. Network resource 115B can differ from network resource 113B, consistent with disclosed embodiments. In some aspects, network resource 113B and network resource 115B can be instances of differing images (e.g., differing virtual machine images, container images, or the like). For example, network resource 113B can be an instance of a first image and network resource 115B can be an instance of a second, later version of the first image. In various aspects, network resource 113B and network resource 115B can be differing software applications or instantiated on differing hardware devices. Network resource 113B and network resource 115B can be configured to communicate with clients in response to client requests. Such communication can include executing tasks and/or providing data. Client requests can be received from other computing devices on network 110B or from devices outside network 110B (e.g., client 140). Network resource 113B and network resource 115B can be configured to handle a common type of client request (e.g., they can be designed to execute the same jobs or retrieve the same files).

Like network resource 113A and network resource 115A, network resource 113B and network resource 115B can each be associated with a monitoring application (not shown), consistent with disclosed embodiments. These monitoring applications can be structured substantially the same as those associated with network resource 113A and network resource 115A and can perform substantially the same functions.

Like network 110A, network 110C can be associated with one or more computing devices (e.g. mobile devices, workstations, desktops, servers, switches, routers, firewalls, and the like). These computing devices can include virtualized devices, such as virtual machines. At least some of these computing devices can be arranged as a cluster or as a grid. The computing devices can be configured as (or configured as part of) a cloud computing infrastructure (e.g., a system providing Infrastructure as a Service, Platform as a Service, Software as a Service, or the like). Such a cloud computing environment may be public, private, or hybrid public-private. In some embodiments, the computing devices can be part of an on-premises computing system. Network 110C can be configured to provide communications, exchange information, and/or facilitate the exchange of information amongst these computing devices. For example, network 110C can be or can include a wide area network, Local Area Network, personal area network, near field communication (NFC) network, cellular network, satellite network, mesh network, or the like. In some aspects, network 110C can overlap with network 110B and/or network A.

Address resource 111 can be a physical server, virtual server, container, application, or the like configured to provide address resolution services. For example, address resource 111 can be a network appliance (e.g., a Trinzic DDI or BIG-IP DNS appliance), a software application (e.g., a NGINX web server), a Kubernetes DNS pod, or the like. Address resource 111 can be configured to provide address resolution services for network resources on other networks (e.g., network resources 113A and 115A), for network resources of different types (e.g., network resources 113B and 115B), and/or for network resources on the same network as address resource 111 (e.g., network resources 113C and 115C). In some embodiments, address resource 111 can be an authoritative DNS server for at least one of network 110A, 110B, or 110C. In various embodiments, address resource 111 can be configured to provide virtual IP or routing services for at least one of network 110A, 110B, or 110C.

Network resource 113C and network resource 115C can be physical servers, virtual machines (e.g., virtual servers), containers (e.g., docker containers), or applications. In some embodiments, network resource 113C and/or network resource 115C can be implemented in whole or in part using cloud-based, on-demand, or other Internet-enabled computing. In various embodiments, network resource 113C and/or network resource 115C can be implemented in whole or in part using an on-premises computing system. In some embodiments, network resource 113C and network resource 115C can be instantiations of a single network resource (e.g., a virtual machine images, container images, or the like). Network resource 113C and network resource 115C can be configured to communicate with clients in response to client requests. Such communication can include executing tasks and/or providing data. Client requests can be received from other computing devices on network 110C or from devices outside network 110C (e.g., client 140). Network resource 113C and network resource 115C can be configured to handle a common type of client request (e.g., they can be designed to execute the same jobs or retrieve the same files).

Like network resource 113A and network resource 115A, network resource 113C and network resource 115C can each be associated with a monitoring application (not shown), consistent with disclosed embodiments. These monitoring applications can be structured substantially the same as those associated with network resource 113A and network resource 115A and can perform substantially the same functions.

Network 130 can be any type of network configured to provide communications between networks 110A, 110B, and 110C. For example, network 130 may be any type of network (including infrastructure) that provides communications, exchanges information, and/or facilitates the exchange of information, such as (all or portions of) the Internet or another Wide Area Network, a Local Area Network, a near field communication (NFC) network, an optical code scanner network, cellular network, satellite network, or any other suitable connection(s) that enables the sending and receiving of information between networks 110A, 110B, and 110C.

Client 140 can be a computing system, such as an IoT device, vehicle infotainment system, smart home appliance, computer-embedded clothing, mobile device, desktop, server, computing cluster, or cloud-based application, among other types of computer-based devices. Client 140 can be configured to consume services provided by network resources 113A and 113B, 113B and 115B, and/or 113C and 115C.

Figure 2:
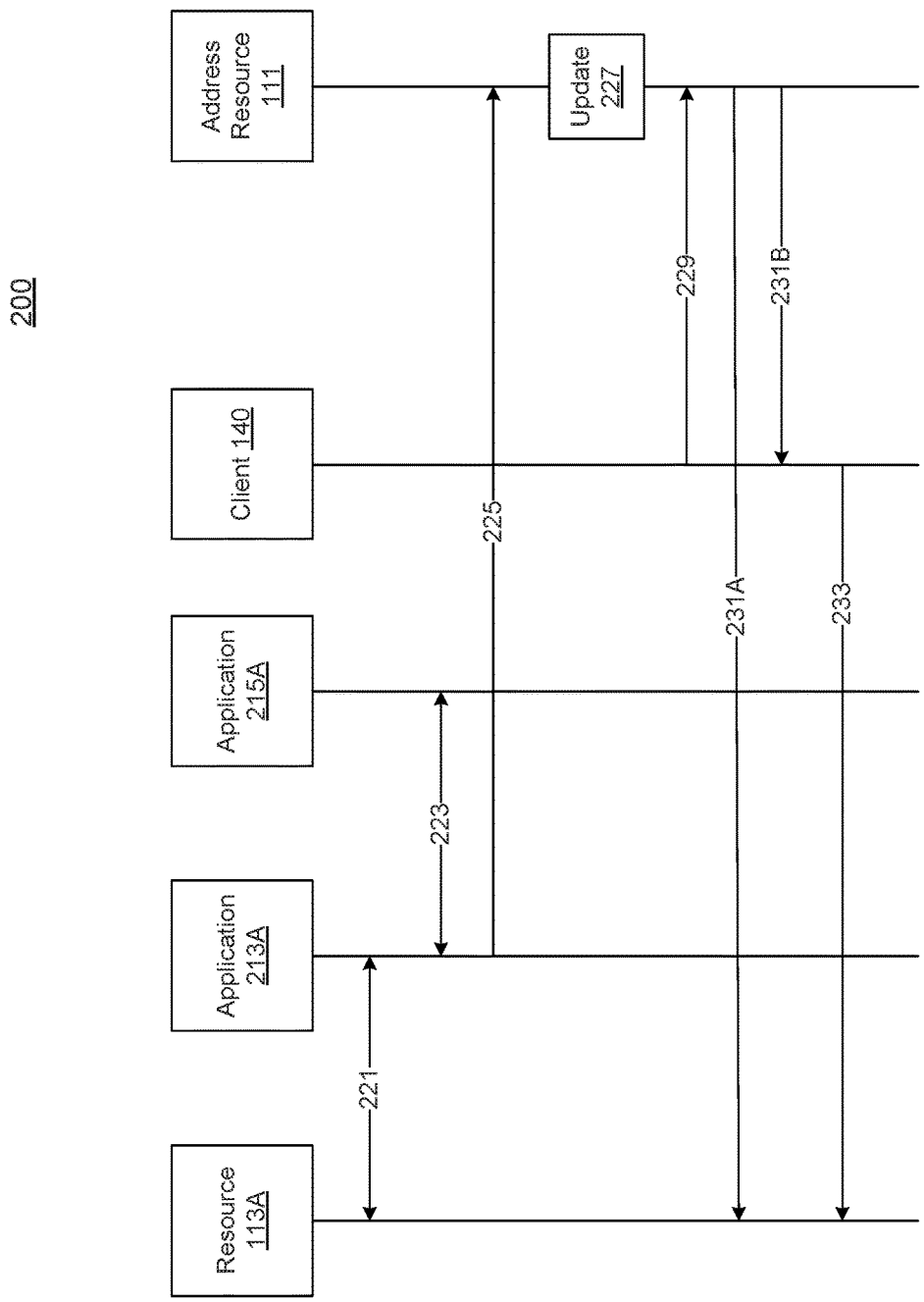
FIG. 2 depicts an exemplary method of decentralized DNS provision.

FIG. 2 depicts an exemplary method 200 of decentralized address control, consistent with disclosed embodiments. Method 200 can include the operations of monitoring network resource 113A, designating monitoring application 213A to interact with address resource 111, contacting address resource 111, updating a stored address association at address resource 111, receiving a request from client 140, and either routing the request to network resource 113A or providing a response to client 140 (which may then contact network resource 113A directly). Address resource 111 can be an authoritative DNS names server in some embodiments, as discussed above. Address resource 111 can serve as a reverse proxy, virtual IP address provider, router, or the like, in various embodiments.

As shown in FIG. 2, the steps of method 200 can be performed by different components of system 100. For example, monitoring application 213A can determine a load characteristic for network resource 113A, communicate with monitoring application 215A to determine which monitoring application provides a report to address resource 111, and provide a report to address resource 111. As an additional example, address resource 111 can receive from monitoring application 213A a report, update a stored address association using the report, and respond to requests received from client 140. One or more of monitoring applications 213A and 215A can be software agents. For example, monitoring applications 213A and 215A can be micro-services running on the same (physical or virtual) host machine as the monitored network resource. In various aspects, these micro-services can be persistent and can exist independently any particular network resource. In some aspects, these micro-services can be configured to detect and begin monitoring network resources without user intervention.

After starting, method 200 can proceed to step 221. In step 221, monitoring applications associated with network resources can determine load characteristics for their associated network resources. For example, monitoring application 213A can determine a load characteristic for network resource 113A. In some aspects, the load characteristic can be page fault, task, operation, or transaction rate; CPU utilization; thread count; memory utilization; network utilization; service availability (e.g., response time, success rate, or the like); or the like. In various aspects, the load characteristic can be a structure (e.g., a vector) including one or more of page fault, task, operation, or transaction rate; CPU utilization; thread count; memory utilization; network utilization; service availability (e.g., response time, success rate, or the like); or the like. In some aspects, the load characteristic can be a metric taking a value dependent upon one or more of page fault, task, operation, or transaction rate; CPU utilization; thread count; memory utilization; network utilization; service availability (e.g., response time, success rate, or the like); or the like. The determined load characteristic can represent, in some embodiments, the current load on network resource 113A. For example, the determined load characteristic can represent the load on network resource 113A over a recent time interval (e.g., the prior minute, five minutes, fifteen minutes, or another time interval). The determined load characteristic can represent, in some embodiments, an anticipated future load on network resource 113A. For example, monitoring application 213A can be configured to predict a value of the determined load characteristic over a future time interval (e.g., the next minute, five minutes, fifteen minutes, or another time interval).

The monitoring applications (e.g., 213A, 215A) can be prompted to determine load characteristics, consistent with disclosed embodiments. For example, a monitoring application can determine load characteristic in response to a request (e.g. a request from another monitoring application or from address resource 111). As an additional example, a monitoring application can be configured to determine a load characteristic according to a predetermined schedule. The monitoring applications can be configured to determine load characteristics synchronously, or in response to individual prompts. The monitoring applications can be configured to determine load characteristics based on information received continuously concerning associated network resources and/or information received in response to a query.

After step 221, method 200 can proceed to step 223. In step 223, monitoring application 213A and monitoring application 215A can communicate to designate a monitoring application to provide a report to address resource 111. This communication can include providing or exchanging values of load characteristics. These load characteristics may have been determined in step 221, or previously. For example, monitoring application 213A may have determined a load characteristic for network resource 113A in step 223, while monitoring application 215A may have determined a load characteristic for another network resource previously.

Monitoring application 213A and monitoring application 215A can individually or collectively designate a monitoring application to provide the report to address resource 111, consistent with disclosed embodiments. As a non-limiting example, monitoring application 213A and monitoring application 215A can independently determine whether to provide the report. As an additional non-limiting example, monitoring application 213A can communicate an intent to provide the report to monitoring application 215A, which can response with a confirmation message.

Monitoring application 213A and monitoring application 215A can designate a monitoring application to provide the report to address resource 111 when a load characteristic of the network resource associated with the monitoring application satisfies a criterion, consistent with disclosed embodiments. The criterion can depend on a relative or absolute load amount in some embodiments. For example, a network resource satisfying this criterion may have the lowest load characteristic value (e.g., this network resource may have the highest transaction rate, lowest CPU utilization, lowest memory utilization, greatest service availability, and/or the like) among a set of network resources. As an additional example, a network resource satisfying this criterion may have a load characteristic falling below a load threshold. As described above, the load characteristic value can reflect the current load, or an anticipated load. The criterion can further depend on a relative or absolute degree in inactivity in some embodiments. For example, a network resource satisfying this criterion may have the longest period of inactivity among a set the network resources. As an additional example, a network resource satisfying this criterion may have experienced a period of inactivity exceeding a duration threshold. In these nonlimiting examples, inactivity may be defined with respect to a load threshold.

After step 223, method 200 can proceed to step 225. In step 225, monitoring application 213A can send a report to address resource 111. In some embodiments, the report can include network address information for network resource 113A. For example, the report can include an IP address (such as an IPv4 or IPv6 address) of network resource 113A. In some embodiments, the report can include a command for execution by address resource 111. For example, the report can include a dynamic DNS update command (e.g., "nsupdate" when address resource 111 is a Linux system, "ipconfig" when address resource 111 is a Windows system, or similar commands for other operating systems).

Monitoring application 213A and monitoring application 215A can be authenticated to address resource 111, consistent with disclosed embodiments. Address resource 111 or another service (e.g., a Kerberos service or like authentication server) can be configured to perform this authentication. This authentication can occur before, or as part of, provision of the report to address resource 111. For example, monitoring application 213A and monitoring application 215A may have been previously authenticated to address resource 111. As an additional example, monitoring application 213A can be authenticated to address resource 111 during provision of the report to address resource 111.

After step 225, method 200 can proceed to step 227. In step 227, address resource 111 can update a stored address association. Address resource 111 can be configured to update the stored address association based on the report received from monitoring application 213A.

The stored address association can associate a network resource name and an IP address, consistent with disclosed embodiments. The network resource name can be common to at least network resource 113A and network resource 115A. For example, the network resource name can be a domain name. In response to the report, address resource 111 can be configured to create, delete, or modify a DNS record corresponding to the domain name. For example, address resource 111 can be configured to create and store a DNS record associating the domain name with the IP address of network resource 113A. In some embodiments, address resource 111 can be configured to create this DNS record with a short time-to-live (e.g., less than fifteen minutes, less five minutes, less than 30 seconds, or less than 10 seconds). In various embodiments, address resource 111 can be configured to create this DNS record with a time-to-live of zero. By setting this DNS record to zero, system 100 can ensure no other recursive DNS server will cache this DNS record. Instead, these recursive DNS servers will contact address resource 111 to request the appropriate DNS address.

The stored address association can associate a first IP address and a second IP address, consistent with disclosed embodiments. In some aspects, the first IP address can be an external IP address. The external IP address can be associated with a service provided by at least network resource 113A and network resource 115A. The external IP address can be a virtual IP address. For example, the external IP address may not correspond to any physical network interface in system 100. The second address can be an internal network address. For example, the second address can correspond to a network resource providing the service (e.g., network resource 113A or network resource 115A).

After step 227, method 200 can proceed to step 229. In step 229, address resource 111 can receive a request from client 140. In some embodiments, the request can be for address information. The request can be received directly from client 140 or indirectly from client 140 through another system (e.g., the request can be received from a recursive DNS server acting on behalf of client 140). The request can specify a common network resource name for a service provided by network resource 113A and 115A. In various embodiments, the request can be a service request directed to an address associated with address resource 111. In some aspects, this address can be a virtual address or an external address.

After step 229, method 200 can proceed to step 231A or 231B. In these steps address resource 111 can provide a response to the client request received in step 229. When client 140 provided in step 229 a service request directed to an address associated with address resource 111, address resource 111 can be configured to route the request to network resource 113A based on the stored address association in step 231A. In such embodiments, method 200 can end after address resource 111 routes the request to the internal address. When client 140 requested address information (directly or indirectly), address resource 111 can be configured to provide the IP address associated with the network resource name based on the stored address association in step 231B. Address resource 111 can provide this IP address directly to client 140, or indirectly through another system (e.g., by responding to the querying recursive DNS server).

After step 231B, method 200 can proceed to step 233. In step 233, network resource 113A can receive a service request from client 140. According to method 200, in this example, client 140 has been directed to network resource 113A by address resource 111 in step 231B. The service request can include a request to communicate with network resource 113A.

Figure 3:
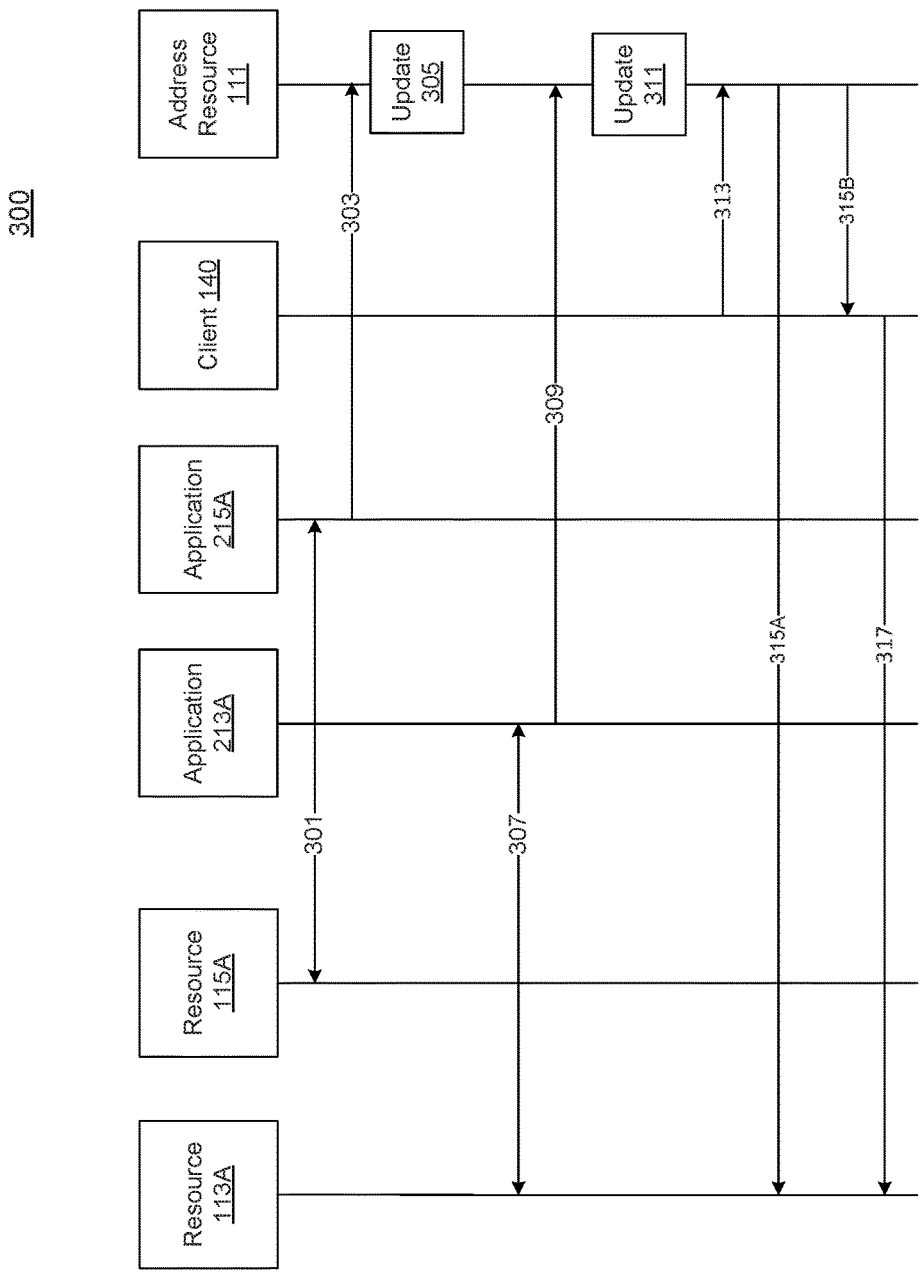
FIG. 3 depicts another exemplary method of decentralized DNS provision.

FIG. 3 depicts an exemplary method 300 of decentralized address control, consistent with disclosed embodiments. Method 300 can include the operations of determining load characteristic for network resource 113A and network resource 115A, receiving a first report from a monitoring application 215A, updating a stored address association at address resource 111, receiving a second report from monitoring application 213A, again updating the stored address association at address resource 111, receiving a request from client 140, and either routing the request to network resource 113A or providing a response to client 140 (which may then contact network resource 113A directly). As in method 200, address resource 111 can be an authoritative DNS name server in some embodiments. Address resource 111 can serve as a reverse proxy, virtual IP address provider, router, or the like, in various embodiments. One or more of monitoring applications 213A and 215A can be software agents. For example, monitoring applications 213A and 215A can be micro-services running on the same (physical or virtual) host machine as the monitored network resource. In various aspects, these micro-services can be persistent and can exist independently any particular network resource. In some aspects, these micro-services can be configured to detect and begin monitoring network resources without user intervention.

As shown in FIG. 3, the steps of method 300 can be performed by different components of system 100. For example, network resources can determine load characteristic information and provide this information to address resource 111. Address resource 111 can receive load characteristic information from network resources, update a stored address association based on this load characteristic information, and respond to requests received from client 140.

After starting, method 300 can proceed to step 301. In step 301, monitoring application 215A can determine a load characteristic for associated network resource 115A. This determination can proceed substantially as described above with regards to step 221 of method 200.

After step 301, method 300 can proceed to step 303. In step 303, monitoring application 215A can provide a report to address resource 111, consistent with disclosed embodiments. Monitoring application 215A can be configured to provide the report to address resource 111 when a criterion is satisfied. Substantially as described above with regards to step 223 of method 200, the criterion can, in some embodiments, depend on an absolute load amount. Likewise, the criterion can, in various embodiments, depend on an absolute degree in inactivity.

The report can include network address information for network resource 115A, consistent with disclosed embodiments. For example, the report can include an IP address (such as an IPv4 or IPv6 address) of network resource 115A. In some embodiments, the report can include a command for execution by address resource 111. For example, the report can include a dynamic DNS update command (e.g., "nsupdate" when address resource 111 is a Linux system, "ipconfig" when address resource 111 is a Windows system, or similar commands for other operating systems). Substantially as described above, with regards to step 225 of method 200, monitoring application 213A and monitoring application 215A can be authenticated to address resource 111. This authentication can occur before, or as part of, provision of the report to address resource 111.

After step 303, method 300 can proceed to step 305. In step 305, address resource 111 can update a stored address association. Address resource 111 can be configured to update the stored address association based on the report received from monitoring application 215A. Substantially as described above with regards to step 227 of method 200, the stored address association can, in some embodiments, associate a network resource name and an IP address, which can be common to at least network resource 113A and network resource 115A. In some embodiments, address resource 111 can be configured to create this DNS record with a short time-to-live or zero time-to-live. Substantially as described above with regards to step 227 of method 200, the stored address association can, in various embodiments, associate a first IP address (e.g., an external IP address) and a second IP address (e.g., an internal network address), consistent with disclosed embodiments.

After starting, method 300 can proceed to step 307. In step 307, monitoring application 213A can determine a load characteristic for associated network resource 113A. This determination can proceed substantially as described above with regards to step 221 of method 200. This determination can occur before, contemporaneous with, or after the determination of a load characteristic for associated network resource 115A in step 301.

After step 305 and step 307, method 300 can proceed to step 309. In step 309, monitoring application 213A can provide a report to address resource 111, consistent with disclosed embodiments. Monitoring application 213A can be configured to provide the report to address resource 111 when a criterion is satisfied. Substantially as described above with regards to step 223 of method 200, the criterion can, in some embodiments, depend on an absolute load amount. Likewise, the criterion can, in various embodiments, depend on an absolute degree in inactivity. In this manner, each of monitoring application 213A and monitoring application 215A can send reports to the network address resolution resource.

The report can include network address information for network resource 113A, consistent with disclosed embodiments. For example, the report can include an IP address (such as an IPv4 or IPv6 address) of network resource 113A. In some embodiments, the report can include a command for execution by address resource 111. For example, the report can include a dynamic DNS update command (e.g., "nsupdate" when address resource 111 is a Linux system, "ipconfig" when address resource 111 is a Windows system, or similar commands for other operating systems). Substantially as described above, with regards to step 225 of method 200, monitoring application 213A and monitoring application 215A can be authenticated to address resource 111. This authentication can occur before, or as part of, provision of the report to address resource 111.

After step 309, method 300 can proceed to step 311. In step 311, address resource 111 can update the stored address association, consistent with disclosed embodiments. Thus, address resource 111 can be configured to update the existing stored address association as new reports are received. In such embodiments, the stored address association can depend upon the most recent report received by address resource. The stored address association can be substantially as described above with regards to step 305.

After step 311, method 300 can proceed to step 313. In step 313, address resource 111 can receive a request from client 140. In some embodiments, the request can be for address information. The request can be received directly from client 140 or indirectly from client 140 through another system (e.g., the request can be received from a recursive DNS server acting on behalf of client 140). The request can specify a common network resource name for a service provided by network resource 113A and 115A. In various embodiments, the request can be a service request directed to an address associated with address resource 111. In some aspects, this address can be a virtual address or an external address.

After step 313, method 300 can proceed to step 315A or 315B. In these steps address resource 111 can provide a response to the client request received in step 313. When client 140 provided in step 313 a service request directed to an address associated with address resource 111, address resource 111 can be configured to route the request to network resource 113A based on the stored address association in step 315A. In such embodiments, method 300 can end after address resource 111 routes the request to the internal address. When client 140 requested address information (directly or indirectly) in step 313, address resource 111 can be configured to provide the IP address associated with the network resource name based on the stored address association in step 315B. Address resource 111 can provide this IP address directly to client 140, or indirectly through another system (e.g., by responding to the querying recursive DNS server).

After step 315B, method 300 can proceed to step 317. In step 317, network resource 113A can receive a service request from client 140. According to method 300, in this example, client 140 has been directed to network resource 113A by address resource 111 in step 315B. The service request can include a request to communicate with network resource 113A.

EXAMPLES

The following non-limiting examples illustrate performance of certain embodiments of the disclosed systems and methods. A first example illustrates address control according to certain embodiments of method 200, described above with regards to FIG. 2.

According the first example, a system includes three server instances. The server instances have the following IP addresses:

Server Instance 1: 10.0.0.1
Server Instance 2: 10.0.0.2
Server Instance 3: 10.0.0.3

Each instance is configured with the IP addresses of the other instances and with the address and authentication credentials for a DNS server. Monitoring applications running on each of the server instances can be configured to periodically (e.g., each second) determine values of a load characteristic for each server and then exchange these values. Based on these shared values, the monitoring applications can collectively determine which server instance is the most available.

In this non-limiting example, the monitoring applications conclude at time $t=t_0$ that the second server instance is the most available server instance. The monitoring application associated with the second instance then connects to the DNS server and either adds or overwrites the following DNS A Record:

example.com→10.0.0.2

Following this update, when a client directly or indirectly requests an address for domain "example.com," the DNS server will resolve this request to the IP address 10.0.0.2. The DNS server will directly or indirectly provide this IP address to the client, which will use it to contact the second server instance.

At time $t=t_0+1$, the monitoring applications conclude that the first server instance is the most available server instance. The monitoring application associated with the first instance then connects to the DNS server and either adds or overwrite the following DNS A Record:

example.com→10.0.0.1

Following this update, when a client directly or indirectly requests an address for domain "example.com," the DNS server will resolve this request to the IP address 10.0.0.1. The DNS server will directly or indirectly provide this IP address to the client, which will use it to contact the first server instance.

According a second example, a system includes the same three server instances having the same IP addresses as in the first example. However, rather than periodically communicating to determine the most available server instance, each monitoring application connects to the DNS server and either adds or overwrites the DNS A Record with the IP address of its associated server instance. Thus, the last monitoring application to provide an update before the DNS server receives a client request "wins." Monitoring applications can be configured to provide updates as the server becomes available, or when an availability criterion is satisfied. Thus, monitoring applications associated with less-available instances update the DNS record less frequently. In this manner, the DNS server can prioritize more-available instances.

Load balancing can therefore be achieved using DNS resolution only according to embodiments of method 200 and method 300, without the need for a centralized load balancer. A special-purpose DNS Server need not be used for this role. This approach can therefore simplify deployment of additional server instances.

The disclosed embodiments may be implemented in a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods and computer program products according to various embodiments of the present invention. In this regard, each block in the flowcharts or block diagrams may represent a software program, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant virtualization platforms, virtualization platform environments, trusted cloud platform resources, cloud-based assets, protocols, communication networks, security tokens and authentication credentials will be developed, and the scope of these terms is intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A non-transitory, computer-readable medium containing instructions that, when executed by at least one processor, cause the at least one processor to perform operations for decentralized load balancing for a plurality of network resources, in a system allowing for load balancing decisions that are decentralized among the plurality of network resources, the operations comprising:
    determining, by a first decentralized load balancing application associated with a first network resource, a load characteristic for the first network resource;
    receiving at the first decentralized load balancing application, from a second decentralized load balancing application associated with a second network resource, a load characteristic for the second network resource;
    determining, by at least the first decentralized load balancing application and based on the load characteristics for the first network resource and second network resource, that network traffic should be received by the first network resource;
    sending, based on the determination that network traffic should be received by the first network resource, a report to a network address resolution resource, the report being configured to cause the network address resolution resource to send the network traffic to the first network resource;
    wherein the network address resolution resource is configured to also receive reports from the second load balancing application, and wherein both the first network resource and the second network resource are each associated with a common network resource name; and
    receiving, from a client that has identified the common network resource name and been directed to the first network resource by the network address resolution resource, a communication directed to the first network resource.

2. The non-transitory computer readable medium of claim 1, wherein the first decentralized load balancing application is integrated into software running on the first network resource.

3. The non-transitory computer readable medium of claim 1, wherein the first decentralized load balancing application is a software agent running on the first network resource.

4. The non-transitory computer readable medium of claim 1, wherein the report includes network address information associated with the first network resource.

5. The non-transitory computer readable medium of claim 4, wherein the network address resolution resource is configured to store the network address information and use it for resolving address queries involving the common network resource name.

6. The non-transitory computer readable medium of claim 1, wherein the network address resolution resource is a DNS server.

7. The non-transitory computer readable medium of claim 1, wherein the first network resource and the second network resource are each instantiations of a single network resource.

8. The non-transitory computer readable medium of claim 1, wherein the first network resource and the second network resource are each instantiated as virtual machines.

9. The non-transitory computer readable medium of claim 1, wherein the first network resource and the second network resource are each instantiated as containers.

10. The non-transitory computer readable medium of claim 1, wherein the determined load characteristic represents the current load of the first network resource.

11. The non-transitory computer readable medium of claim 1, wherein the determined load characteristic represents an anticipated future load of the first network resource.

12. A computer-implemented method for decentralized load balancing for a plurality of network resources, in a system allowing for load balancing decisions that are decentralized among the plurality of network resources, the method comprising:
    determining, by a first decentralized load balancing application associated with a first network resource, a load characteristic for the first network resource;
    receiving at the first decentralized load balancing application, from a second decentralized load balancing application associated with a second network resource, a load characteristic for the second network resource;
    determining, by at least the first decentralized load balancing application and based on the load characteristics for the first network resource and second network resource, that network traffic should be received by the first network resource;
    sending, based on the determination that network traffic should be received by the first network resource, a report to a network address resolution resource, the report being configured to cause the network address resolution resource to send the network traffic to the first network resource;
    wherein the network address resolution resource is configured to also receive reports from the second load balancing application, and wherein both the first network resource and the second network resource are each associated with a common network resource name; and
    receiving, from a client that has identified the common network resource name and been directed to the first network resource by the network address resolution resource, a communication directed to the first network resource.

13. The computer-implemented method of claim 12, wherein the first decentralized load balancing application is configured to communicate with the second decentralized load balancing application.

14. The computer-implemented method of claim 13, wherein the first decentralized load balancing application and the second decentralized load balancing application each determine that the first decentralized load balancing application should send the report to the network address resolution resource.

15. The computer-implemented method of claim 14, wherein the network address resolution resource updates stored network address information using the report as it is received.

16. The computer-implemented method of claim 13, wherein the first decentralized load balancing application and the second decentralized load balancing application designate, based on a load criterion of their respective determined load characteristics, the first decentralized load balancing application to send the report to the network address resolution resource.

17. The computer-implemented method of claim 16, wherein the load criterion is determined on the basis of the first network resource having a lower determined load than the second network resource.

18. The computer-implemented method of claim 16, wherein the load criterion is determined on the basis of the first network resource having experienced a period of inactivity lasting a threshold amount of time.

19. The computer-implemented method of claim 12, wherein the first load balancing application and the second load balancing application are authenticated to the network address resolution resource.

20. The computer-implemented method of claim 12, wherein the first network resource and the second network resource are each identical instantiations of the same network resource.

21. The computer-implemented method of claim 12, wherein the first network resource and the second network resource are each different but are designed to handle a common type of client request.

22. A computer-implemented method for decentralized address management in a system allowing for load balancing decisions that are decentralized among a plurality of network resources, the method comprising:

determining, by a first decentralized monitoring application associated with a first network resource, a load characteristic for the first network resource;

determining, by at least the first decentralized monitoring application, and based on the load characteristic for the first network resource and a load characteristic for a second network resource, that network traffic should be received by the first network resource;

sending, based on the determination that network traffic should be received by the first network resource, a first report to an address resource;

wherein the first decentralized monitoring application is configured to communicate with other monitoring applications, and wherein the first decentralized monitoring application and the other monitoring applications are each configured to send reports to the address resource, and wherein the address resource is configured to update stored network address information using the reports to the address resource as they are received; and receiving a client request routed to the first network resource from the address resource when the first report is the most recently received of the reports to the address resource.

* * * * *